(12) United States Patent
Pamplin

(10) Patent No.: US 12,206,251 B1
(45) Date of Patent: Jan. 21, 2025

(54) PORTABLE BLENDER WITH WIRELESS CHARGING

(71) Applicant: BlendJet Inc., Benicia, CA (US)

(72) Inventor: Ryan Michael Pamplin, San Juan, PR (US)

(73) Assignee: BlendJet Inc., Benicia, CA (US)

( * ) Notice: Subject to any disclaimer, the term of this patent is extended or adjusted under 35 U.S.C. 154(b) by 0 days.

(21) Appl. No.: 18/476,113

(22) Filed: Sep. 27, 2023

Related U.S. Application Data

(63) Continuation of application No. 17/195,338, filed on Mar. 8, 2021, now Pat. No. 11,824,365.

(51) Int. Cl.
*H02J 50/10* (2016.01)
*A47J 43/042* (2006.01)
*A47J 43/046* (2006.01)
*A47J 43/07* (2006.01)
*A47J 43/08* (2006.01)
(Continued)

(52) U.S. Cl.
CPC ............ *H02J 50/10* (2016.02); *A47J 43/042* (2013.01); *A47J 43/046* (2013.01); *A47J 43/0716* (2013.01); *A47J 43/085* (2013.01); *B01F 35/212* (2022.01); *B01F 35/2214* (2022.01); *H02J 50/90* (2016.02);
(Continued)

(58) Field of Classification Search
USPC ........................................................ 320/137
See application file for complete search history.

(56) References Cited

U.S. PATENT DOCUMENTS 2,086,858 A 7/1937 Dunkelberger
D114,673 S 5/1939 Cravaritis
(Continued)

FOREIGN PATENT DOCUMENTS

CA 195728 1/1920
CN 102239633 A * 11/2011 ............. A61B 18/00
(Continued)

OTHER PUBLICATIONS

Vitamix A3300 Ascent Series Smart Blender. Date First Available on Amazon.com Jan. 17, 2017. https://www.amazon.com/ Vitamix-Blender-Professional-Grade-Low-Profile-Container/dp/B01N11XJQ6/ref(Year: 2017).
(Continued)

*Primary Examiner* — Mohammed Alam
(74) *Attorney, Agent, or Firm* — Esplin & Associates, PC

(57) ABSTRACT

A blender using different charging modes with wireless charging is disclosed. Exemplary implementations may include a base assembly, a container assembly, an electrical motor, a blending component, a control interface, blending control circuitry, charging control circuitry, and/or other components. The base component may include a rechargeable battery and a wireless charging interface. The charging control circuitry may be configured to make different types of detections related to the availability and/or usage of electrical power and related to the usage and alignment of the wireless charging interface with an external charging structure. The charging control circuitry may conduct electrical power to the rechargeable battery using at least two different charging modes, thus providing different amounts of electrical power to the rechargeable battery in different charging modes.

18 Claims, 5 Drawing Sheets

(51) Int. Cl.
*B01F 35/212* (2022.01)
*B01F 35/221* (2022.01)
*B01F 101/00* (2022.01)
*B01F 101/06* (2022.01)
*H02J 50/90* (2016.01)

(52) U.S. Cl.
CPC ... *B01F 2101/06* (2022.01); *B01F 2101/1805* (2022.01); *H02J 2207/30* (2020.01); *H02J 2310/14* (2020.01)

(56) References Cited

U.S. PATENT DOCUMENTS

| | | |
|---|---|---|
| 2,250,142 A | 7/1941 | Umstead |
| D182,306 S | 3/1958 | Rutan |
| D202,469 S | 10/1965 | Paul |
| 3,262,626 A | 7/1966 | Davis |
| D242,302 S | 11/1976 | Madi |
| 4,497,580 A | 2/1985 | Doyel |
| D327,818 S | 7/1992 | Haralson |
| D347,144 S | 5/1994 | Brady |
| 5,546,467 A | 8/1996 | Denenberg |
| D419,369 S | 1/2000 | Naft |
| D433,598 S | 11/2000 | Naft |
| 6,418,227 B1 | 7/2002 | Kuo |
| D478,530 S | 8/2003 | Sachuk |
| D499,606 S | 12/2004 | Feil |
| D519,314 S | 4/2006 | Blaise |
| D591,589 S | 5/2009 | Myers |
| D620,756 S | 8/2010 | Lown |
| 7,766,540 B2 | 8/2010 | Saunders |
| D697,798 S | 1/2014 | Sorensen |
| D752,381 S | 3/2016 | Wahl |
| 9,364,806 B2 | 6/2016 | King |
| D760,586 S | 7/2016 | Seiders |
| D795,008 S | 8/2017 | Eyal |
| D798,668 S | 10/2017 | Steel |
| D804,910 S | 12/2017 | Steel |
| D809,344 S | 2/2018 | Guthrie |
| D811,807 S | 3/2018 | Gollnick |
| D816,399 S | 5/2018 | Burns |
| D816,400 S | 5/2018 | Beckman |
| D833,804 S | 11/2018 | Huang |
| D839,054 S | 1/2019 | Rane |
| D842,027 S | 3/2019 | Boroski |
| 10,219,655 B2 | 3/2019 | Van Der Gaag |
| D850,205 S | 6/2019 | Hotell |
| D862,235 S | 10/2019 | Sanghavi |
| D863,888 S | 10/2019 | Meyers |
| D865,447 S | 11/2019 | Meyers |
| D873,616 S | 1/2020 | Kaiser |
| D879,560 S | 3/2020 | Lowette |
| 10,714,116 B2 | 7/2020 | Tintor |
| D897,782 S | 10/2020 | Lane |
| D899,186 S | 10/2020 | McLean |
| D907,433 S | 1/2021 | Meyers |
| D907,593 S | 1/2021 | Nunomura |
| 10,968,029 B1 | 4/2021 | Rane |
| D917,955 S | 5/2021 | Yao |
| 11,006,784 B2 | 5/2021 | Pamplin |
| D929,185 S | 8/2021 | Omdahl, II |
| D931,039 S | 9/2021 | Pamplin |
| D932,843 S | 10/2021 | Ames |
| D935,276 S | 11/2021 | Lane |
| D951,097 S | 5/2022 | Hur |
| D960,659 S | 8/2022 | Seiders |
| D973,437 S | 12/2022 | Pamplin |
| D977,902 S | 2/2023 | Kim |
| D979,321 S | 2/2023 | Coakley |
| 11,602,243 B2 | 3/2023 | Fan |
| D988,799 S | 6/2023 | Endo |
| D991,743 S | 7/2023 | Kim |
| D994,423 S | 8/2023 | Meyers |
| D999,015 S | 9/2023 | Vue |
| D1,006,531 S | 12/2023 | Pamplin |
| D1,007,948 S | 12/2023 | Pamplin |
| D1,011,845 S | 1/2024 | Lamance |
| D1,027,656 S | 5/2024 | Wang |
| D1,028,611 S | 5/2024 | Pamplin |
| 2005/0174882 A1 | 8/2005 | Krasne |
| 2007/0297281 A1 | 12/2007 | Saunders |
| 2012/0228952 A1* | 9/2012 | Hall .......... H02J 50/70 307/104 |
| 2012/0242159 A1* | 9/2012 | Lou .......... H03H 7/40 307/104 |
| 2015/0282673 A1 | 10/2015 | Harvey |
| 2015/0305567 A1 | 10/2015 | Koetz |
| 2016/0296899 A1 | 10/2016 | Hoare |
| 2017/0105558 A1 | 4/2017 | Andreas |
| 2017/0119212 A1 | 5/2017 | Petrillo |
| 2018/0009576 A1 | 1/2018 | Sullivan |
| 2019/0150669 A1 | 5/2019 | Fan |
| 2020/0223603 A1 | 7/2020 | Ames |
| 2021/0121840 A1 | 4/2021 | Pamplin |
| 2021/0154632 A1 | 5/2021 | Pamplin |
| 2022/0233024 A1 | 7/2022 | Lee |
| 2022/0285984 A1* | 9/2022 | Pamplin ............ A47J 43/085 |
| 2023/0380632 A1 | 11/2023 | Pamplin |
| 2023/0391512 A1 | 12/2023 | Sullivan |

FOREIGN PATENT DOCUMENTS

| | | |
|---|---|---|
| CN | 209437073 U | 9/2019 |
| CN | 110613300 A | 12/2019 |
| CN | 306889374 | 10/2021 |
| CN | 308283199 | 10/2023 |
| EA | 008330419 | 1/2021 |
| EP | 3202293 A1 | 8/2017 |
| FR | 2899085 A1 | 10/2007 |
| GB | 2134804 A | 8/1984 |
| GB | 6294780 | 7/2023 |
| IN | 384620001 | 12/2023 |
| JP | H06178734 | 6/1994 |
| JP | 2016514980 | 5/2016 |
| JP | D1559194 | 9/2016 |
| JP | D1708864 | 3/2022 |
| KR | 3009173440000 | 8/2017 |

OTHER PUBLICATIONS

Mialoe Portable Blender, posted at Amazon.com on Oct. 12, 2017, [site visited Oct. 23, 2023]. Available from internet, URL: <https://www.amazon.com/dp/B076DJ3DKK/> (Year: 2017).

Youtube Orbiter Drinking Lid, posted May 6, 2023 [online], [retrieved Dec. 14, 2023]. Retrieved from internet, https://www.youtube.com/watch?v=wDO20Ldw5VM (Year: 2023).

Video "O'Healthy Portable & Wireless USB Electric Juicer Blender" uploaded Sep. 10, 2018 by user KimstoreTV. 3 pages. Retreived from Internet <https://www.youtube.com/watch?v=vQL3pPAILWE.

Video "TravelBlend Portable Blender with Charging Adapter" uploaded Jun. 12, 2017 by user HSNtv, 11 pages. Retreived from Internet <https ://www.youtube.com/watch?v=zSYv-8_59Y0>.

Video and machine-generated transcript "USB Rechargeable Portable Electric Juice Blender—Extsud" uploaded Aug. 10, 2016 by user Product Peeks. 9 pages. Retreived from Internet <https://www.youtube.com/watch?v=qyYZpDHNGMQ>.

Video of KKSTAR Electric Juice Cup uploaded Mar. 4, 2017 by user bigclivedotcom, 4 pages. Retreived from Internet <https://www.youtube.com/watch?v=FWw9XZ7QDBQ>.

Blendjet 2 Accessory XL Jar, posted date unknown [online], [retrieved Dec. 14, 2023]. Retrieved from internet, https://rawandtonic.com/product/blendjet-2-accessory-xl-jar/. 4 pages.

Blendjet XL Jar, posted date unknown [online], [retrieved Dec. 14, 2023]. Retrieved from internet, https://blendjet.com/products/xl-jar?variant=39753280028738. 11 pages.

Facebook Post, posted Jul. 1, 2022 [online], [retrieved Dec. 14, 2023]. Retrieved from internet, https://www.facebook.com/blendjet/posts/1402233700264579 (Year: 2022) 1 page.

Today Article, posted Sep. 13, 2022 [online], [retrieved Dec. 14, 2023]. Retrieved from internet, https://today.com/shop/blendjet-2-portable-blender-review-t261869 (Year: 2022) 6 pages.

(56) References Cited

OTHER PUBLICATIONS

Portable Blender, Greecho. Date First Available, Oct. 14, 2023 [online], [site visited Jun. 24, 2024]. Available from URL: < https://www.amazon.com/dp/B0CL2KVQLR/ref=sbl_dpx_kitchen-blenders_BOCXPRLGJD_0?th=1> (Year: 2023).

Glass Water Bottle, SipZest. Date First Available, Oct. 12, 2022 [online], [site visited Jun. 24, 2024]. Available from URL: < https://www.amazon.com/dp/BOBHYXC7PG/> (Year: 2022).

Graduated Glass Drinking Cup, Clobeau. Date First Available, May 19, 2023 [online], [site visited Jun. 26, 2024]. Available from URL: < https://www.amazon.com/Graduated-Borosilicate-Measuring-Beginners-Measurements/dp/B0C5R7TSPJ/>(Year: 2023).

Blending Jar, Cuisinart. Date First Available, Oct. 26, 2015 [online], [site visited Jun. 26, 2024]. Available from URL: < https://www.amazon.com/Cuisinart-CPB-300JAR-Blending-Jar-32oz/dp/B0176UXAMQ/ >(Year: 2015).

Replacement Blender Cup, savebuy. Date First Available, Oct. 13, 2021 [online], [site visited Jun. 26, 2024] Available from URL: < https://www.amazon.com/Blender-OSTERIZER-GALAXIE-BLENDER-CHOPPER/dp/B09JCKM4L9/ > (Year: 2021).

Extra Large Portable Blender Cup, Blendjet. Date First Available, Aug. 23, 2022 [online], [site visited Jun. 26, 2024]. Available from URL: < https://www.walmart.com/ip/BlendJet-XL-Jar-Extra-Large-Portable-Blender-Cup-32-oz-Clear/5062469452> (Year: 2022).

Replacement Stainless Steel Jar, Blendin. Date First Available, Oct. 19, 2017 [online], [site visited Jun. 27, 2017]. Available from URL: < https://www.amazon.com/Blendin-Replacement-Stainless-Compatible-Osterizer/dp/B076L91NQ8/>(Year: 2017).

Stainless Steel Jar, Wuyan. Date First Available, Jul. 13, 2021 [online], [site visited Jun. 27, 2017]. Available from URL: < https://www.amazon.com/dp/B0999DLWB6/ > (Year: 2021).

Prasad, M.G., George, S., Saley, C., Winstanley, K .. (2014). An enclosed wrapping for reducing blender noise, INTER-NOISE and NOISE-CON Congress and Conference Proceedings, NoiseCon14, Fort Lauderdale, Florida, pp. 539-1128, pp. 702-707(6), Institute of Noise Control Engineering. (Year: 2014).

Costa-Felix, p. B. (2016). Measurement Precision Under Repeatability Conditions of a Batch of Sound Power Assessment for Blenders in Reverberation Room. Archives of Acoustics, 41(3), pp. 591-597 (2016). (Year: 2016).

Bae, J.-N., Lukman, G.F., Ahn, J.-W. and Lee, D.-H. (2020). Variable speed reference control of a high-speed BLDC motor for a blender machine. IET Electr. Power Appl., 14, pp. 2154-2162. < https://doi.org/10.1049/iet-epa.2020.0078> (Year: 2020).

Milosevic, A., Schaufelberger, U. (2005). Active Noise Control. [Diploma Thesis, University of Applied Sciences Rapperswill HSR]. Accessed online from: < https://web.archive.org/web/20120426050529/http://www.medialab.ch/archiv/pdf_studien_diplomarbeiten/ da05/da2005-104_ActiveNoiseControl.pdf>. (Year: 2005).

* cited by examiner

PORTABLE BLENDER WITH WIRELESS CHARGING

FIELD OF THE DISCLOSURE

The present disclosure relates to portable blenders configured for wireless charging of a rechargeable battery included in the portable blender.

BACKGROUND

Blenders are known, typically as consumer-grade home appliances. User interfaces are known, e.g., for home appliances. Home appliances are usually not portable, not rechargeable, and do not support wireless charging.

SUMMARY

One aspect of the present disclosure relates to a blender configured for wireless charging of a rechargeable battery using different charging modes. In some implementations, the blender may be portable due to its size, and/or its rechargeability. By virtue of true portability, a user can take the blender anywhere and create drinks, shakes, smoothies, baby food, sauces, and/or other concoctions. The blender may be charged wirelessly. By virtue of the control interface and the control circuitry described in this disclosure, different charging modes may be used and different power modes of operation may be available to the user.

The blender may include a blending component, a base assembly, a container assembly, a control interface, blending control circuitry, charging control circuitry, and/or other components. As used herein, the term "foodstuffs" may include ingredients ranging from solid to liquid, from hot to cold or frozen, in any combination. As used herein, the term "ingredient" merely connotes something fit to ingest, and not necessarily nutritional value. For example, ice and/or ice cubes may be ingredients. The blending component may be configured to rotate around a rotational axis and blend the foodstuffs during blending by the blender. The base assembly may include an electrical motor, a rechargeable battery, a wireless charging interface, and/or other components. The electrical motor may be configured to drive rotation of the blending component. The rechargeable battery may be configured to power the electrical motor. The wireless charging interface may be configured to conduct electrical power to one or both of the rechargeable battery and the electrical motor. The wireless charging interface may include a secondary coil. The wireless charging interface may support inductive charging through a charging structure that includes a primary coil. The charging structure may be powered through an external power source that is external to the blender. In some implementations, the container assembly may be configured to hold the foodstuffs within a container body during blending by the blender. In some implementations, the control interface may be configured to control operation of the blender upon usage of the control interface by a user.

In some implementations, the charging control circuitry may be configured to make a first type of detections regarding the usage of the control interface by the user. In some implementations, the charging control circuitry may be configured to make a second type of detections regarding availability of power from the rechargeable battery. In some implementations, the charging control circuitry may be configured to make a third type of detections regarding usage of the wireless charging interface to conduct the electrical power to one or both of the rechargeable battery and the electrical motor. In some implementations, the charging control circuitry may be configured to make a fourth type of detections regarding alignment of the wireless charging interface with the charging structure. In some implementations, the charging control circuitry may be configured to conduct (or control the conduction of) the electrical power to the rechargeable battery using one of at least two different charging modes, including a first charging mode and a second charging mode, based=on one or more detections of the first, second, third, and fourth type of detections. Usage and/or selection of either the first charging mode or the second charging mode may be based on one or more detections of the fourth type of detections. During the first charging mode, a first amount of electrical power may be conducted by the wireless charging interface to the rechargeable battery at a first charging rate. During the second charging mode, a second amount of electrical power may be conducted by the wireless charging interface to the rechargeable battery at a second charging rate, and wherein the first charging rate is greater than the second charging rate.

In some implementations, the blending control circuitry may be configured to make a fifth type of detection regarding usage of one of the at least two different charging modes. In some implementations, the blending control circuitry may be configured to control, based on one or more detections of the first, second, third, and fifth type of detections, the electrical motor during the rotation of the blending component using at least two different power modes of operation, including a first power mode of operation and a second power mode of operation. Usage and/or selection of either the first power mode or the second power mode may be based on one or more detections of the fourth type of detections. During the first power mode of operation, a third amount of electrical power may be provided to the electrical motor. In some implementations, the third amount of electrical power may be provided conjointly by the rechargeable battery and the wireless charging interface such that the blending component is configured to rotate at a first rotational speed. The first rotational speed may be limited in the first power mode of operation by a first rotational speed. In some implementations, in the first power mode of operation, the electrical motor may be powered only by the rechargeable battery. During the second power mode of operation, a fourth amount of electrical power may be provided by one or both of the rechargeable battery and the wireless charging interface to the electrical motor such that the blending component is configured to rotate at a second rotational speed. The second rotational speed may be limited in the second power mode of operation by a second rotational speed limit. In some implementations, the third amount of electrical power may be greater than the fourth amount of electrical power (or, in other words, boosted). In some implementations, the first rotational speed limit may be greater than the second rotational speed limit.

As used herein, any association (or relation, or reflection, or indication, or correspondency) involving assemblies, blending components, blades, motors, rotational axes, longitudinal axes, diameters, batteries, couplings, interfaces, buttons, detectors, detections, indicators, magnetic components, rotations, rotational speeds, speed limits, modes of operation, amounts of electrical power, couplings, and/or another entity or object that interacts with any part of the blender and/or plays a part in the operation of the blender, may be a one-to-one association, a one-to-many association, a many-to-one association, and/or a many-to-many association or "N"-to-"M" association (note that "N" and "M" may be different numbers greater than 1).

As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
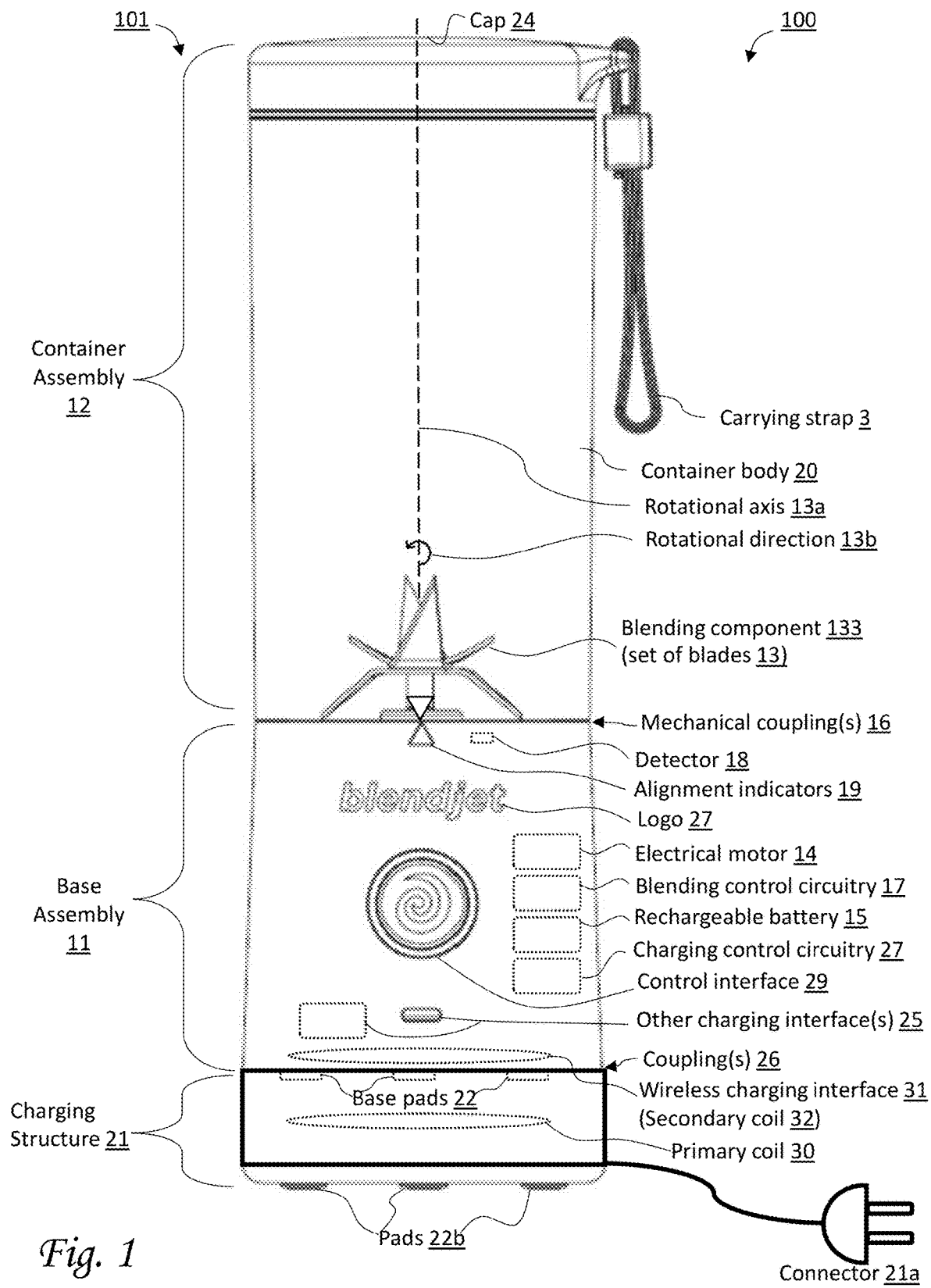
FIG. 1 shows a front view of a charging structure and a blender configured for wireless charging of rechargeable battery using different charging nodes, in accordance with one or more implementations.

FIG. 1 shows a blender 100 configured for wireless charging of a rechargeable battery 15 using different charging nodes, in accordance with one or more implementations. FIG. 1 shows a combination 101 of blender 100 and a charging structure 21. Combination 101 may also be referred to as a blending system 101.

Blender 100 may include one or more of a base assembly 11, a container assembly 12, a blending component 133, a control interface 29, blending control circuitry 17 (depicted in FIG. 1 as a dotted rectangle to indicate this component may be embedded within base assembly 11, and not readily visible from the outside), charging control circuitry 27 (depicted in FIG. 1 as a dotted rectangle to indicate this component may be embedded within base assembly 11, and not readily visible from the outside), a wireless charging interface 31 (depicted in FIG. 1 as a dotted oval to indicate this component may be embedded within base assembly 11, and not readily visible from the outside), and/or other components. Charging structure 21 may be configured to support charging of blender 100. In some implementations, charging structure 21 may be powered through an external power source (not depicted) that is external to blender 100, e.g., through a connector 21a. In some implementations, connector 21a may be configured to plug into a socket and/or power supply. In some implementations, blender 100 may be configured to support other charging interfaces 25 (in some cases, at the same time).

Base assembly 11 and container assembly 12 may be configured to be coupled during blending by blender 100. For example, in some implementations, base assembly 11 and container assembly 12 may be mechanically coupled, e.g., through one or more mechanical couplings 16, which may be threaded. Other types of couplings may be envisioned for blender 100, though leak-proof options are preferred, since blender usage commonly includes one or more liquid ingredients. In some implementations, charging control circuitry 27 and/or other components may be included in base assembly 11, e.g., within base assembly 11. For example, one or more of control interface 29, blending control circuitry 17, charging control circuitry 27, electrical motor 14 (depicted in FIG. 1 as a dotted rectangle to indicate this component may be embedded within base assembly 11, and not readily visible from the outside), rechargeable battery 15 (depicted in FIG. 1 as a dotted rectangle to indicate this component may be embedded within base assembly 11, and not readily visible from the outside), and/or other components may be integrated permanently into base assembly 11 such that base assembly 11 forms an integral whole. In some implementations, the phrase "integrated permanently" may refer to components being integrated such that they are not readily accessible, serviceable, and/or replaceable by a user, or at least not during ordinary usage by the user, including, but not limited to, charging, blending, cleaning, and storing for later use.

In some implementations, base assembly 11 may include one or more of a base body (e.g., a housing configured to contain the components of base assembly 11), blending component 133 (e.g., a set of blades 13, also referred to as a set of one or more blades 13), electrical motor 14, rechargeable battery 15, wireless charging interface 31, one or more other charging interfaces 25 (a first charging interface is depicted in FIG. 1 as a charging port visible on the outside of blender 100, and a second charging interface is depicted in FIG. 1 as a dotted rectangle to indicate this component may be embedded within base assembly 11, and not readily visible from the outside), one or more mechanical couplings 16, a detector 18 (depicted in FIG. 1 as a dotted rectangle to indicate this component may be embedded within base assembly 11, and not readily visible from the outside), one or more alignment indicators 19, control interface 29 (depicted in FIG. 1 as being marked with a swirl symbol), and/or other components.

In some implementations, one or more mechanical couplings 16 may include threaded couplings. For example, one or more mechanical couplings 16 may include a first mechanical coupling and a second mechanical coupling. In some implementations, the first mechanical coupling may be included in base assembly 11, and may be a female threaded coupling configured to fit together with the second mechanical coupling (which may be included in container assembly 12). Other implementations are envisioned within the scope of this disclosure. The first mechanical coupling and the second mechanical coupling may be configured to (temporarily and detachably) couple base assembly 11 to container assemble 12.

Blending component 133 may include one or more structural components configured to blend foodstuffs, including but not limited to one or more blending bars, one or more blades, and/or other structural components configured to rotate. For example, in some implementations, blending component 133 may include set of blades 13, which may be rotatably mounted to base assembly 11 to blend foodstuffs. Blending component 133 may be configured to rotate around a rotational axis 13a. Rotational axis 13a is depicted in FIG. 1 as a geometric two-dimensional line extending indefinitely through blending component 133, and is not a physical axis. Rather, rotational axis 13a indicates how blending component 133 rotates in relation to other components of blender 100, e.g., in a rotational direction 13b. In some implementations, blending component 133 may be mounted permanently to base assembly 11. In some implementations, set of blades 13 may include one, two, three, four, five, or more pairs of blades. In some implementations, a pair of blades may include two blades on opposite sides of rotational axis 13a. In some implementations, a pair of blades may have two blades such that the distal ends of these two blades are at the same horizontal level. In some implementations, as depicted in the upright configuration of blender 100 in FIG. 1, set of blades 13 may include six blades that form three pairs of blades. In some implementations, set of blades 13 may include at least two downward blades, which may prevent and/or reduce foodstuffs remaining unblended when disposed under the upward blades. In some implementations, set of blades 13 may include at least four upward blades. In some implementations, including six blades may be preferred over including less than six blades, in particular for blending ice and/or ice cubes. By using more blades, more points of contact will hit the ice at substantially the same time, which reduces the likelihood that a piece of ice is merely propelled rather than broken, crushed, and/or blended, in particular for implementations using a limited amount of power (here, the term limited is used in comparison to non-portable counter-top blenders that are permanently connected to common outlets during blending), such as disclosed herein. As used herein, directional terms such as upward, downward, left, right, front, back, and so forth are relative to FIG. 1 unless otherwise noted.

In some implementations, base assembly 11 and charging structure 21 may be coupled by way of one or more couplings 26 (by way of non-limiting example, mechanically coupled, magnetically coupled, and/or otherwise coupled). In some implementations, base pads 22 may couple and/or connect with charging structure 21 as one of couplings 26. Couplings 26 may perform one or more of the following functions: (i) align a primary coil 30 and a secondary coil 32, (ii) facilitate reduction of oscillation of base assembly 11 during the rotation of the blending component 133, (iii) facilitate reduction of oscillation of a container body 20 included in container assembly 12 during the rotation of blending component 133, and/or provide other benefits.

Figure 4A:
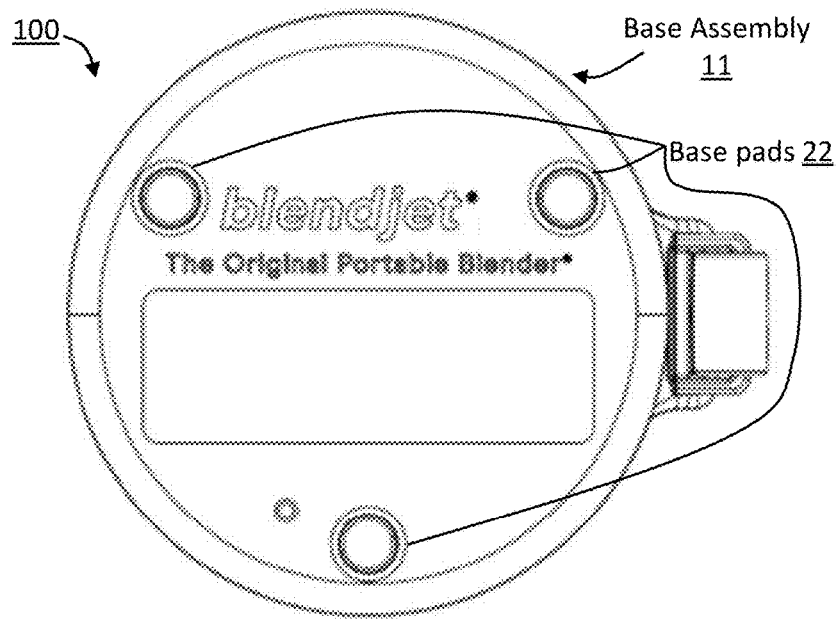
FIGS. 4A-4B-4C-4D show bottom views of base assemblies of a blender configured for wireless charging of rechargeable battery using different charging nodes, in accordance with one or more implementations.
Figure 4B:
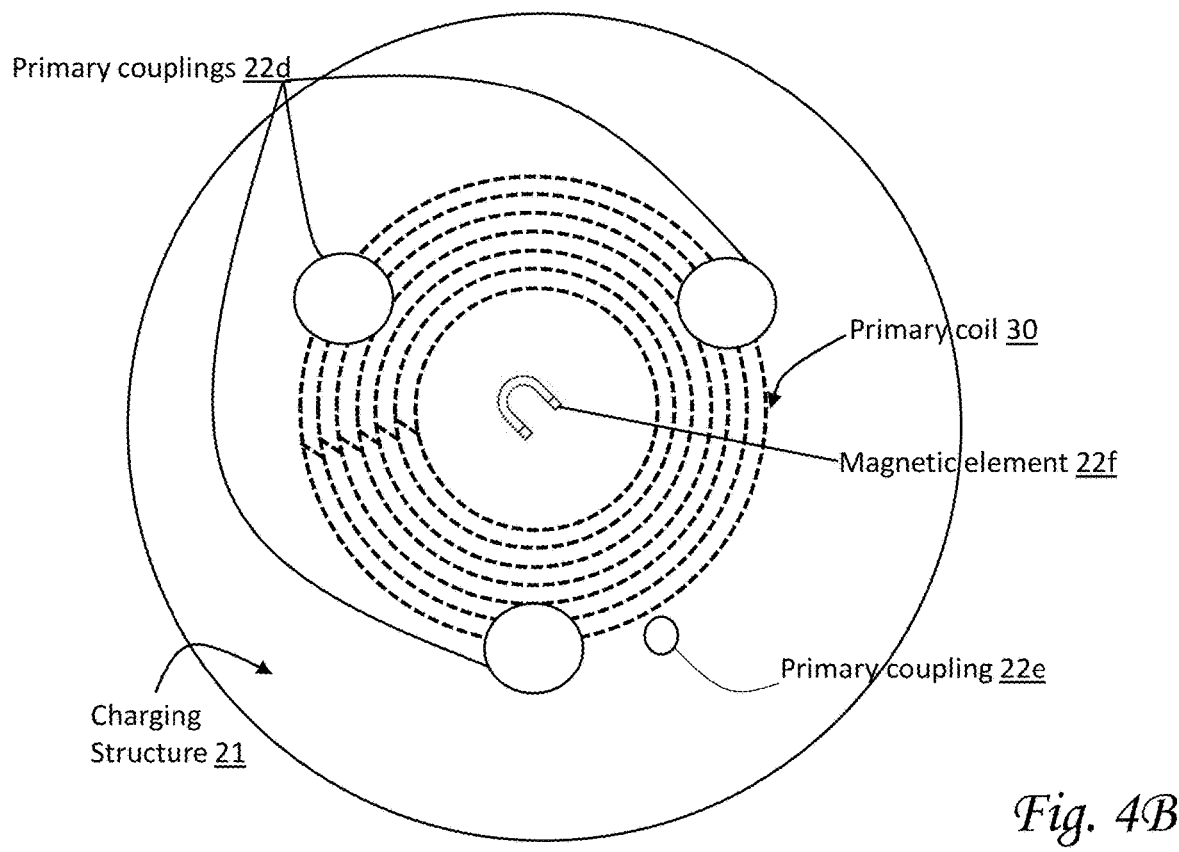

By way of non-limiting example, FIG. 4A shows a bottom view of base assembly 11, including base pads 22 and FIG. 4B show a top view of charging structure 21, including primary coil 30 that may be internal to charging structure 21, primary couplings 22d, and a primary coupling 22e. A mechanical coupling between base assembly 11 and charging structure 21 may provide improved alignment between secondary coil 32 of wireless charging interface 31 (see FIG. 1 and/or FIG. 4C) and primary coil 30 of charging structure 21, in addition to providing improved stability during blending. In some implementations, base pads 22 may be shaped to provide the mechanical coupling with charging structure 21 (see FIG. 1 and/or FIG. 4B). In some implementations, the base pads 22 may protrude to mechanically couple with primary couplings 22d. In some implementations, base pads 22 may include magnetic elements to mechanically couple with primary couplings 22d. In some implementations, primary couplings 22d may include one or both of shallow cavities that are similar size of base pads 22, magnetic elements that are similar size of base pads 22, and/or other elements.

Figure 4C:
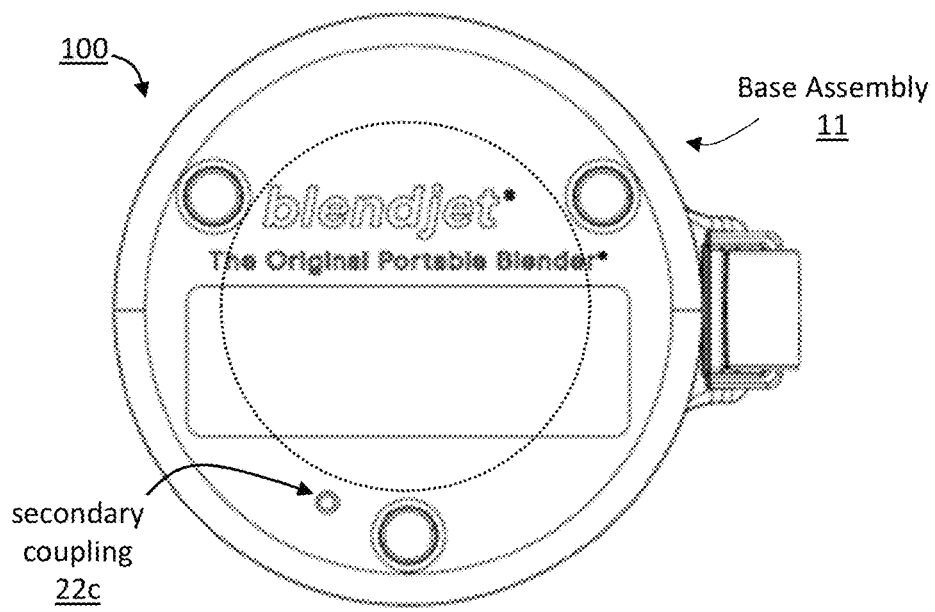

By way of non-limiting example, FIG. 4C shows a bottom view of base assembly 11, including a secondary coupling 22c. Secondary coupling 22c may be configured to provide the mechanical coupling between base assembly 11 and charging structure 21 (not shown) of which may provide improved alignment between secondary coil 32 and primary coil 30 (see FIG. 1), and improved stability during blending. Referring to FIG. 4B, in some implementations, secondary coupling 22c may include a screw or otherwise a male threaded coupling (attached to base assembly 11) to provide threaded coupling (as a form of a mechanical coupling) between primary coupling 22e attached to or within charging structure 21. Primary coupling 22e may be a threaded nut or otherwise a female threaded coupling configured to fit together with the secondary coupling 22c. In some implementations, the screw as primary coupling 22e and the threaded nut as the secondary coupling 22c may be reversed.

Figure 4D:
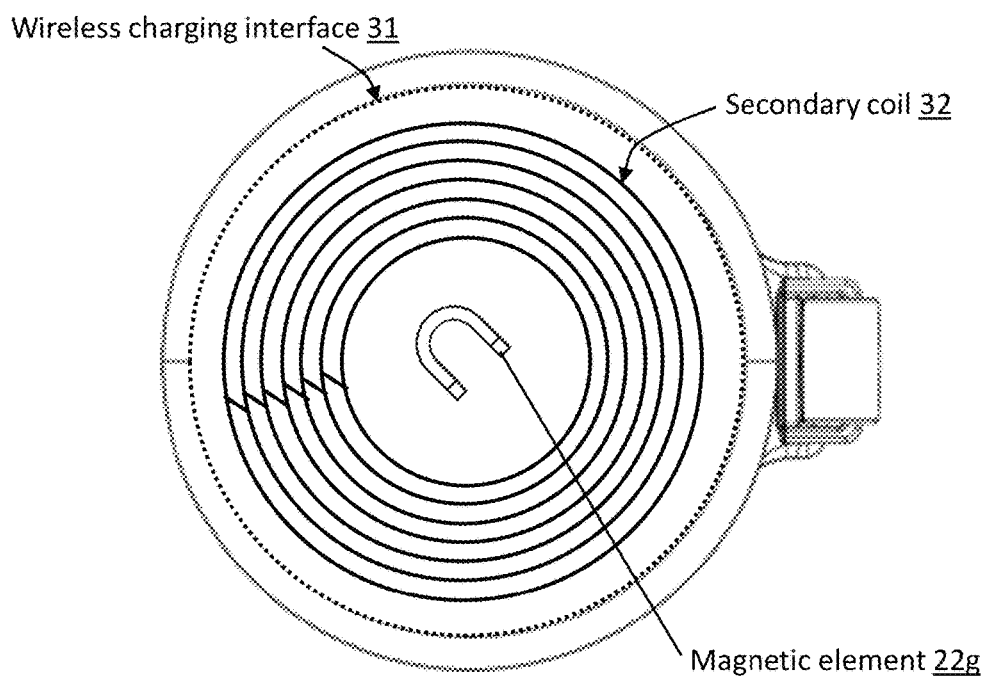

By way of non-limiting example, secondary coupling 22c may include a non-electrical port and primary coupling 22e may include a corresponding non-electrical prong that protrudes from charging structure 21 such that secondary coupling 22c is configured to fit into primary coupling 22e. In some implementations, this secondary coupling 22c and primary coupling 22e may include magnetic elements to attract and attach to each other. In some implementations, multiple ones of this secondary coupling 22c may be included on the bottom of base assembly 11 and multiple ones of this primary coupling 22e may be include on the charging structure 21. Referring to FIGS. 4B and 4D, by way of non-limiting example, charging structure 21 and wireless charging interface 31 may include a magnetic element 22f and a magnetic element 22g, respectively, as a coupling.

By way of non-limiting example, in some implementations, a first part a spring-loaded toggle latch (not pictured) may be attached to base assembly 11 and a second part of the spring-loaded toggle latch (not pictured) may be attached to charging structure 21 such that the first part and the second part are fastened to provide the mechanical coupling. Base pads 22, primary coupling 22d, primary coupling 22e, secondary coupling 22c, the magnetic elements as depicted, the spring-loaded toggle latch and parts thereof, and/or other couplings may be considered and referred to as couplings 26. Other implementations are envisioned within the scope of this disclosure. In some implementations, charging structure 21 may include pads 22b (see FIG. 1) at the bottom, e.g., for improved stability in an upright position.

Figure 3:
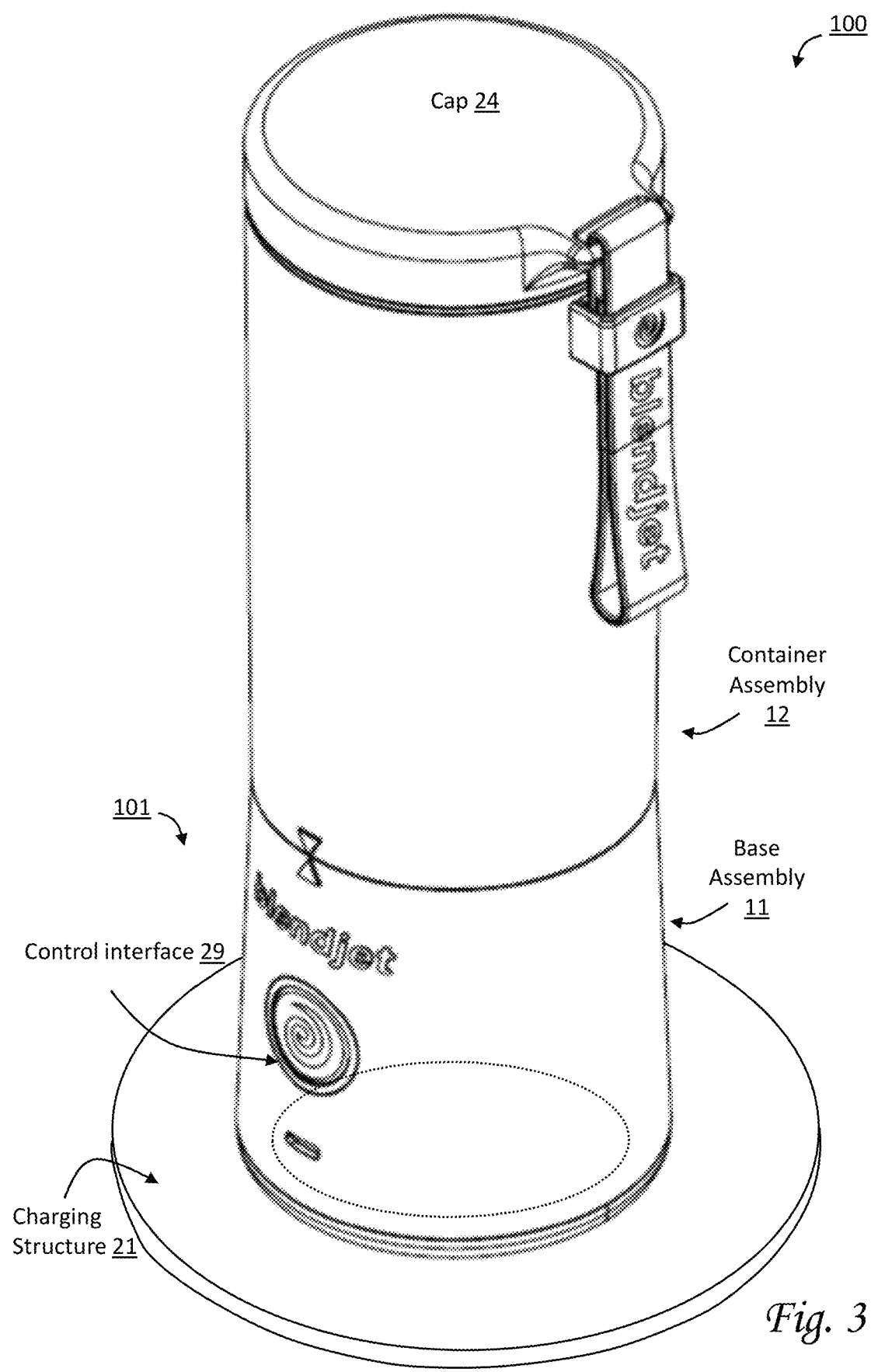
FIG. 3 shows an isometric elevated view of a charging structure and a blender configured for wireless charging of rechargeable battery using different charging nodes, in accordance with one or more implementations.

FIG. 4D shows an internal bottom view of base assembly 11, including wireless charging interface 31. Wireless charging interface 31 in base assembly 11 may include secondary coil 32, and charging structure 21 may include primary coil 30, such that primary coil 30 and secondary coil 32 support, including but not limited to (electromagnetic) inductive charging of rechargeable battery 15 (see FIG. 1) and/or inductive conducting of electrical power into blender 100 (through inductive coupling between primary coil 30 and secondary coil 32). Optimal alignment of primary coil 30 and secondary coil 32 may facilitate the inductive charging. In some implementations, charging structure 21 and blender 100 may be configured to support charging through resonant inductive coupling. In some implementations, charging structure 21 may be configured to support wireless charging, such as, e.g., inductive charging. In some implementations, charging structure 21 may be a dock or docking pad, e.g., as depicted in FIG. 1. In some implementations, charging structure 21 may be a charging mat or charging pad, as depicted in FIG. 3. By way of non-limiting example, FIG. 3 shows an isometric elevated view of combination 101 of charging structure 21 and blender 100 (including base assembly 11, control interface 29, container assembly 12, cap 24, and other components).

Referring to FIG. 1, container assembly 12 may include one or more of container body 20, a cap 24 (e.g., to prevent spilling during blending), a carrying strap 3 (e.g., configured to carry blender 100), and/or other components. Container body 20 may form a vessel to hold and/or contain foodstuffs within container assembly 12. In some implementations, container assembly 12 and/or container body 20 may be a cylindrical body and/or have a cylindrical shape, as depicted in FIG. 4. In some implementations, container body 20 may be open at one or both ends. In some implementations, container body 20 may be closed at the bottom. In some implementations, the dimensions of container assembly 12 may be such that the internal volume of container assembly 12 can hold 8, 10, 12, 14, 16, 18, 20, 22, 24, 28, 32, 36, 48, or more ounces.

Electrical motor 14 may be configured to rotationally drive blending component 133. In some implementations, electrical motor 14 may operate at a voltage between 5V and 15V. In one or more preferential implementations, electrical motor 14 may operate at a voltage of about 7.4V. In some implementations, electrical motor 14 may be configured to operate at multiple different voltages, depending on the power supplied to electrical motor 14. For example, during a first mode of operation, electrical motor 14 may operate at a first voltage, during a second mode of operation, electrical motor 14 may operate at a second voltage that is higher than the first voltage, and so forth. In some implementations, electrical motor 14 may be a universal motor. In some implementations, electrical motor 14 may have a variable-frequency drive. In some implementations, electrical motor 14 may be a brushed DC electric motor.

Electrical motor 14 may be configured to be powered by rechargeable battery 15. Alternatively, and/or simultaneously, in some implementations, electrical motor 14 may be configured to be powered through wireless charging interface 31 and/or one or more other charging interfaces 25. One or more other charging interfaces 25 may be configured to conduct electrical power to one or both of rechargeable battery 15 and electrical motor 14.

Rechargeable battery 15 may be configured to power electrical motor 14. In some implementations, and in some modes of operation, rechargeable battery 15 may be configured to power electrical motor 14 such that, during blending by blender 100, no power is supplied to electrical motor 14 from an external power source. In some implementations, rechargeable battery 15 may be non-removable. As used herein, the term "non-removable" may mean not accessible to users during common usage of blender 100, including charging, blending, cleaning, and storing for later use. In some implementations, rechargeable battery 15 may be not user-replaceable (in other words, non-removable). In some implementations, rechargeable battery 15 may be user-replaceable. In some implementations, rechargeable battery 15 may be store-bought. In some implementations, rechargeable battery 15 may have a capacity between 1000 mAh and 20000 mAh.

In some implementations, charging control circuitry 27 may be configured to control charging of rechargeable battery 15. For example, charging control circuitry 27 may control the transfer of electrical power through one or more of wireless charging interface 31 and other charging interfaces 25 into rechargeable battery 15. For example, responsive to a detection that rechargeable battery 15 is fully charged, charging control circuitry 27 may prevent the transfer of electrical power through wireless charging interface 31 and other charging interface 25 into rechargeable battery 15.

In some implementations, other charging interfaces 25 may be standardized. In some implementations, other charging interfaces 25 may be configured to conduct electrical power to rechargeable battery 15. In some implementations, other charging interfaces 25 may be configured to conduct electrical power to charge rechargeable battery 15, e.g., from an external power source. Alternatively, and/or simultaneously, in some implementations, other charging interfaces 25 may be configured to conduct electrical power to electrical motor 14.

Other charging interfaces 25 may include, for example, a first charging interface. The first charging interface may be a universal serial bus (USB) port configured to receive an electrical connector, e.g., for charging rechargeable battery 15 and/or providing electrical power to electrical motor 14. The electrical connector, if used, may be connected to an external power source. A USB port is merely one type of standardized charging interface. Other standards are contemplated within the scope of this disclosure. In some implementations, other charging interfaces 25 may support (at least part of) the Qi wireless charging standard. In some implementations, other charging interfaces 25 may support (at least part of) other wireless charging standards widely adopted in the industry. In some implementations, other charging interfaces 25 may be covered for protection and/or other reasons.

Detector 18 may be configured to detect whether mechanical couplings 16 are coupled in a manner operable and suitable for blending by blender 100. In some implementations, operation of detector 18 may use one or more magnetic components. For example, in some implementations, one or more magnetic components are included in container body 20. Engagement may be detected responsive to these one or more magnetic components being aligned and sufficiently close to one or more matching magnetic components that may be included in base assembly 11. In some implementations, blender 100 may include one or more alignment indicators 19, depicted in FIG. 1 as matching triangles, to visually aid the user in aligning base assembly 11 with container assembly 12 in a manner operable and suitable for blending. In some implementations, one or more alignment indicators 19 may be in the front, in the back, and/or in other parts of blender 100.

In some implementations, detector 18 may be configured to detect whether one or more couplings 26 are coupled in a manner operable and suitable for providing electrical power to blender 100 and blending by blender 100. In some implementations, operation of detector 18 may use one or more magnetic components, similar as described above.

Control interface 29 may be part of the user interface of blender 100. Through control interface 29, a user of blender 100 may control the operation of blender 100, including but not limited to transitions between different modes of operation. For example, the different modes of operation may include multiple (power) modes of operation. In some implementations, the power modes of operation of blender 100 may include at least two power modes of operation: a first power mode of operation, a second power mode of operation, and/or other power modes of operation. For example, during various modes of operation of blender 100, blending control circuitry 17 may be configured to effectuate rotation of blending component 133 (in other words, to effectuate blending), e.g., for a particular duration. In some implementations, blender 100 may use a third and/or fourth power mode of operation.

In some implementations, control interface 29 may include one or more buttons. For example, a button of control interface 29 may be configured to be pushed by the user (as used herein, a push may be released quickly or may be held down, or may be followed by one or more additional pushes, e.g. in the case of a double push). In some implementations, control interface 29 includes exactly one button. For example, in some implementations, the button may be the only user-manipulatable portion of control interface 29, such that no other button or user interface component controls the operation of blender 100 or the transitions between different modes of operation used by blender 100.

In some implementations, control interface 29 may include one or more controllable light-emitting components. For example, the light-emitting components may be light-emitting diodes (LEDs) or other types of lights. In some implementations, the one or more controllable light-emitting components may be configured to selectively light up. In some implementations, the one or more controllable light-emitting components may be configured to indicate, to a user, a current mode of operation of blender 100, an occurrence of a transition between different modes of operation, a warning for the user, a current charging mode, and/or other information regarding the operation of blender 100. For example, the one or more controllable light-emitting components may use different colors, intensities, patterns, sequences, and/or other combinations of light to provide information to the user. In some implementations, control interface 29 may include one or more controllable sound-emitting components, such as a speaker, configured to selectively emit sound. In some implementations, the one or more controllable sound-emitting components may be configured to indicate, to a user, a current mode of operation of blender 100, an occurrence of a transition between different modes of operation, a warning for the user, a current charging mode, and/or other information regarding the operation of blender 100. For example, the one or more controllable sound-emitting components may use different frequencies, volumes, patterns, sequences, and/or other combinations of sound to provide information to the user. In some implementations, control interface 29 may include one or more haptic components to provide feedback to a user.

Charging control circuitry 27 may be configured to make and/or use different types of detections regarding blender 100. In some implementations, a first type of detections may be regarding the usage of control interface 29 by the user. For example, blending control circuitry 17 may detect whether the button of control interface 29 has been pushed by the user, or released, or pushed again. In some implementations, a second type of detections may be regarding availability of power from rechargeable battery 15. The second type of detections may detect how much power is available and/or unavailable from rechargeable battery 15. In some implementations, a third type of detections may be regarding usage of wireless charging interface 31 and other charging interfaces 25 to conduct electrical power to one or both of rechargeable battery 15 and electrical motor 14. For example, a detection of the third type may be that secondary coil 32 of wireless charging interface 31 is at least partially proximate with primary coil 30 of charging structure 21. For example, a detection of the third type may be that secondary coil 32 is not at least partially proximate with primary coil 30.

In some implementations, a fourth type of detections may be regarding alignment of wireless charging interface 31 with charging structure 21. The alignment of wireless charging interface 31 with charging structure 21 (i.e., primary coil 30 and secondary coil 32) may be facilitated by one or more of the couplings described in FIG. 4A-D. For example, the fourth type of detections may include detecting alignment of the magnetic elements 22f and 22g within charging structure 21 and within wireless charging interface 31, respectively, to align primary coil 30 and the secondary coil 32, alignment of the non-electrical prongs with corresponding non-electrical ports, the threaded coupling, the fastening of the first and second part of the spring-loaded latch, and/or other couplings 26 that facilitate the alignment. Additional types of detections are envisioned within the scope of this disclosure.

In some implementations, charging control circuitry 27 may be configured to conduct (or control conduction of) the electrical power to rechargeable battery 15. In some implementations, charging control circuitry 27 may be configured to conduct (or control conduction of) the electrical power using at least two different charging modes, such as a first charging mode, a second charging mode, a third charging mode, and so on. Usage and/or selection of one of the different charging modes (e.g., either the first charging mode, the second charging mode, etc.) by charging control circuitry 27 may be based on one or more detections of a particular type (e.g., the fourth type) of detections. In some implementations, upon a detection that wireless charging interface 31 is aligned with charging structure 21, charging control circuitry 27 may be configured to conduct (or control conduction of) the electrical power to rechargeable battery 15 and/or the electrical motor at about 12V, about 15V, or other voltage that is higher than standard charging rates available (i.e., the charging rate that may be available if wireless charging interface 31 is close enough to charging structure 21, but not suitably aligned, which may be about 6V, about 7V, about 7.5V, about 10V, and/or about another voltage that is lower than the higher available rates). In some implementations, selection of one of the different charging modes may be further based on first, second, third, and/or other types of detections. In some implementations, charging control circuitry 27 may be implemented as a printed circuit board (PCB).

In some implementations, during the first charging mode, a first amount of electrical power may be conducted by wireless charging interface 31 to rechargeable battery 15, e.g., at a first charging rate. The first charging mode may be selected by charging control circuitry 27 upon at least the fourth detection that wireless charging interface 31 and charging structure 21 are optimally aligned (e.g., by virtue of magnetic elements). That is, primary coil 30 and secondary coil 32 may be aligned to conduct and/or provide an ideal amount of electrical power and an ideal charging rate, i.e., the first amount of electrical power at the first charging rate.

In some implementations, during the second charging mode, a second amount of electrical power may be conducted by wireless charging interface 31 to rechargeable battery 15, e.g., at a second charging rate. The second charging mode may be selected by charging control circuitry 27 upon at least the fourth detection that wireless charging interface 31 and charging structure 21 are less than optimally aligned. That is, primary coil 30 and secondary coil 32 may be slightly misaligned (though close enough for charging). Based on the misalignment, conducting and/or providing the ideal amount of electrical power and at the ideal charging rate may not be feasible. Thus, in some implementations, the first charging rate may be greater than the second charging rate. In some implementations, additionally, the first amount of electrical power may be greater than the second amount of electrical power.

In some implementations, during the third charging mode, a fifth amount of electrical power may be conducted and/or provided by at least the first charging interface (with or without electrical power being conducted and/or provided by wireless charging interface 31) to rechargeable battery 15, e.g., at the first charging rate. In some implementations, the fifth amount of electrical power may be greater than the first amount of electrical power.

Blending control circuitry 17 may be configured to control different functions and/or operations of blender 100, including but not limited to turning blender 100 on and off, transitioning between different modes of operation, controlling of electrical motor 14 regarding and/or during rotation of blending component 133, determining whether mechanical couplings 16 are engaged properly for blending, determining whether couplings 26 are engaged properly for blending, controlling or otherwise using control interface 29, and/or performing other functions for blender 100. In some implementations, blending control circuitry 17 may be configured to prevent rotation of blending component 133 responsive to certain determinations, including but not limited to a determination that mechanical couplings 16 are not engaged (or not engaged properly for the intended operation of blender 100). In some implementations, blending control circuitry 17 may be configured to use control interface 29 to convey information regarding the operational status of blender 100 to a user. For example, control interface 29 may include a light that can illuminate in various colors and/or patterns. In some implementations, blending control circuitry 17 may be implemented as a printed circuit board (PCB). In some implementations, charging control circuitry 27 and blending control circuitry 17 may be implemented in a single PCB.

In some implementations, blending control circuitry 17 may be configured to make different types of detections that charging control circuitry 27 makes regarding blender 100. In some implementations, a fifth type of detections made by blending control circuitry 17 may be regarding usage of one of the at least two different charging modes. In some implementations, blending control circuitry 17 may be configured to control electrical motor 14, e.g., during the rotation of blending component 133. In some implementations, blending control circuitry 17 may be configured to control electrical motor 14 using at least two different power modes of operation, such as a first power mode of operation and a second power mode of operation. Additional power modes of operation are envisioned within the scope of this disclosure. In some implementations, control by blending control circuitry 17 may be based on the fourth type of detections. In some implementations, control by blending control circuitry 17 may be further based on one or more detections of the first, second, third, fifth, and/or other types of detections.

In some implementations, during the first power mode of operation, a third amount of electrical power may be provided to electrical motor 14. The third amount of electrical power may be provided conjointly by rechargeable battery 15 and wireless charging interface 31. As used herein, the term "conjointly" refers to multiple sources of electrical power operating at the same time to provide electrical power, in this case to one or more of rechargeable battery 15, electrical motor 14 and/or other components of blender 100. In other words, power provided by one source may be combined with power provided by another source. In some implementations, during the second power mode of operation, a fourth amount of electrical power may be provided by one or both of rechargeable battery 15 and through wireless charging interface 31 to electrical motor 14.

In some implementations, the third amount of electrical power may be greater than the fourth amount of electrical power. For example, in some implementations, the third amount of electrical power may be at least 20% greater than the fourth amount of electrical power. For example, in some implementations, the third amount of electrical power may be at least 30% greater, 40% greater, 50%, and/or 100% greater than the fourth amount of electrical power.

Responsive to one or more couplings 26 described herein (or other types of couplings) providing optimal alignment of wireless charging interface 31 and charging structure 21, during the first power mode of operation, oscillation of base assembly 11 during and of container body 20 during the rotation of blending component 133 may be reduced and the third amount (i.e., the greater amount compared to the fourth amount) of electrical power may be provided. In some implementations, given one or more couplings 26 (or lack thereof) providing less than optimal alignment of wireless charging interface 31 and charging structure 21, reduction of the oscillation of base assembly 11 and of container body 20 during the rotation of blending component 133 may be greater during the first power mode of operation than during the second power mode of operation, and the amount of electrical power provided during the first power mode of operation (i.e., the third amount) may be greater than the amount of electrical power provided during the second power mode of operation (i.e., the fourth amount).

In some implementations, electrical motor 14 may be configured to rotate blending component 133 at a particular rotational speed. In some implementations, the rotational speed may be limited by a particular rotational speed limit. In some implementations, the particular rotational speed and/or the particular rotational speed limit may be controlled, e.g., by blending control circuitry 17, such that different power modes of operation correspond to different rotational speeds and/or rotational speed limits. For example, during the first power mode of operation, electrical motor 14, and thus blending component 133, may be configured to rotate using a first rotational speed and/or limited by a first rotational speed limit. For example, during the second power mode of operation, electrical motor 14, and thus blending component 133, may be configured to rotate using a second rotational speed and/or limited by a second rotational speed limit. For example, during a third power mode of operation, electrical motor 14, and thus blending component 133, may be configured to rotate using a third rotational speed and/or limited by a third rotational speed limit, and so forth. In some implementations, blending control circuitry 17 may be configured to control electrical motor 14 during rotation of blending component 133. For example, blending control circuitry 17 may control the speed of the rotation of blending component 133 during blending by blender 100. In some implementations, the first rotational speed limit may be greater than the second rotational speed limit. For example, in some implementations, the first rotational speed limit may be at least 20% greater than the second rotational speed limit. For example, in some implementations, the first rotational speed limit may be at least 30% greater, 40% greater, 50%, and/or 100% greater than the second rotational speed limit. Alternatively, and/or simultaneously, in some implementations, the output wattage of electrical motor 14 during the first power mode of operation may be about 20%, about 30%, about 40%, about 50%, and/or about 100% greater than the output wattage during the second power mode of operation. Alternatively, and/or simultaneously, in some implementations, the torque of electrical motor 14 during the first power mode of operation may be about 20%, about 30%, about 40%, about 50%, and/or about 100% greater than the torque during the second power mode of operation.

In some implementations, blender 100's maximum rotational speed may range between 15,000 rotations per minute (RPM) and 40,000 RPM. In some implementations, blender 100's maximum rotational speed may range between 10,000 rotations per minute (RPM) and 50,000 RPM. In one or more implementations, electrical motor 14 may rotate blending component 133 at a rotational speed of about 16,500 RPM (e.g., during a first power mode of operation). In one or more implementations, electrical motor 14 may rotate blending component 133 at a rotational speed ranging between about 20,000 RPM and about 25,000 RPM (e.g., during a second and/or third power mode of operation). In one or more implementations, electrical motor 14 may rotate blending component 133 at a rotational speed ranging between about 30,000 RPM and about 33,000 RPM (e.g., during a second and/or third power mode of operation).

For example, the first charging mode may be used and/or selected by charging control circuitry 27 and the first power mode of operation may be used and/or selected by blending control circuitry 17 responsive to a combination of different detections, such as, by way of non-limiting example, a first detection (being of the first type of detections) that the button has been pushed, a second detection (being of the second type of detections) that at least some the power from the rechargeable battery is unavailable, a third detection (being of the third type of detections) that wireless charging interface 31 and/or other charging interfaces 25 (e.g. the first charging interface) can provide power, and a fourth detection (being of the fourth type of detections) that wireless charging interface 31 and charging structure 21, and respective coils thereof, are optimally aligned in a manner that enables a charging rate higher than the second charging rate (described elsewhere in this disclosure).

For example, the second charging mode may be used and/or selected by charging control circuitry 27 and the second power mode of operation may be used and/or selected by blending control circuitry 17 responsive to a combination of these first, second, and third detections in addition to a fourth detection (being of the fourth type of detections) that wireless charging interface 31 and charging structure 21, and respective coils thereof, are less than optimally aligned in a second manner that enables charging rates that are less than the first charging rate (described elsewhere in this disclosure).

In some implementations, the third detection may mean the user has connected to other charging interface 25 (e.g., the first charging interface), through which additional electrical power may be available to rechargeable battery 15 in particular, blender 100 in general, and/or to electrical motor 14. Therefore, the third detection may mean the user has connected to other charging interface 25 (e.g., the first charging interface) in addition to coupling to active wireless charging through charging structure 21, through which additional electrical power may be available to rechargeable battery 15, blender 100 in general, and/or to electrical motor 14 in particular. As such, the third charging mode may be used and/or selected by charging control circuitry 27 and the second power mode of operation may be used and/or selected by blending control circuitry 17 responsive to a combination of (i) the first detection, (ii) the second detection, (iii) the third detection that both wireless charging interface 31 and other charging interfaces 25 (e.g., the first charging interface) can provide power to rechargeable battery 15, blender 100 in general, and/or to electrical motor 14, and (iv) the fourth detection that wireless charging interface 31 and charging structure 21, and respective coils thereof, are less than optimally aligned. In some implementations, additional charging modes are envisioned within the scope of this disclosure.

In some implementations, blending control circuitry 17 may be configured to control operation of control interface 29 to enable transitions between different modes of operation. The transitions may include a first, second, third, fourth, fifth transition, and so forth. For example, a first transition may be from a ready-to-blend mode to the first power mode of operation. In some implementations, the first transition may occur responsive to an occurrence of the first type of detections (in the ready-to-blend mode). For example, a second transition may be to the second power mode of operation, and so forth. In some implementations, the second transition may occur responsive to an occurrence of the second and/or third types of detections.

In some implementations, control by a user of blender 100 may be based on a switch (not shown), a button, and/or other types of user interfaces suitable to turn consumer appliances on and off. Control interface 29 (e.g., through one or more light-emitting components) may be configured to illuminate in various colors (red, blue, purple, etc.) and/or patterns (solid, fast blinking, slow blinking, alternating red and blue, etc.). Control interface 29 may convey information regarding the operational status of blender 100 to a user. The operational status of blender 100 may be determined by blending control circuitry 17 and charging control circuitry 17. Control interface 29 may be controlled by blending control circuitry 17. For example, if control interface 29 is solid purple, blender 100 may be charging and/or insufficiently charged to blend. For example, if control interface 29 is solid blue, blender 100 may be ready for blending (e.g., in the ready-to-blend mode). For example, if control interface 29 is alternating red and blue, blender 100 may not be ready for blending due to base assembly 11 and container assembly 12 not being coupled properly and/or fully. For example, if control interface 29 is flashing purple, blender 100 may not be ready for charging and blending due to base assembly 11 and charging structure 21 not being mechanically coupled properly and/or fully. For example, in some implementations, threaded couplings between assembly 11 and container assembly 12 may need to be tightened sufficiently for proper operation of blender 100, and control interface 29 may warn the user when the threaded couplings are not tightened sufficiently and/or correctly.

In some implementations, blending control circuitry 17 may be configured to support an empty-battery power mode of operation, during which no electrical power is provided by (and/or insufficient electrical power is available through) rechargeable battery 15, but power is provided to electrical motor 14 through one or more of wireless charging interface 31 and other charging interfaces 25.

In some implementations, blender 100 may have fewer components then depicted in FIG. 1. For example, one particular embodiment of the invention is configured for wireless charging of rechargeable battery 15 using different charging modes. This particular embodiment may include base assembly 11, container assembly 12, blending component 133, control interface 29, and charging control circuitry 27. In this particular embodiment, base assembly 11 includes wireless charging interface 31 that supports inductive charging through charging structure 21. In this particular embodiment, charging control circuitry 27 is configured to make one or more detections regarding one or both of the alignment and/or the coupling between wireless charging interface 31 and charging structure 21. Based on the one or more detections, rechargeable battery 15 may be charged at a first charging rate or a second charging rate.

Figure 2:
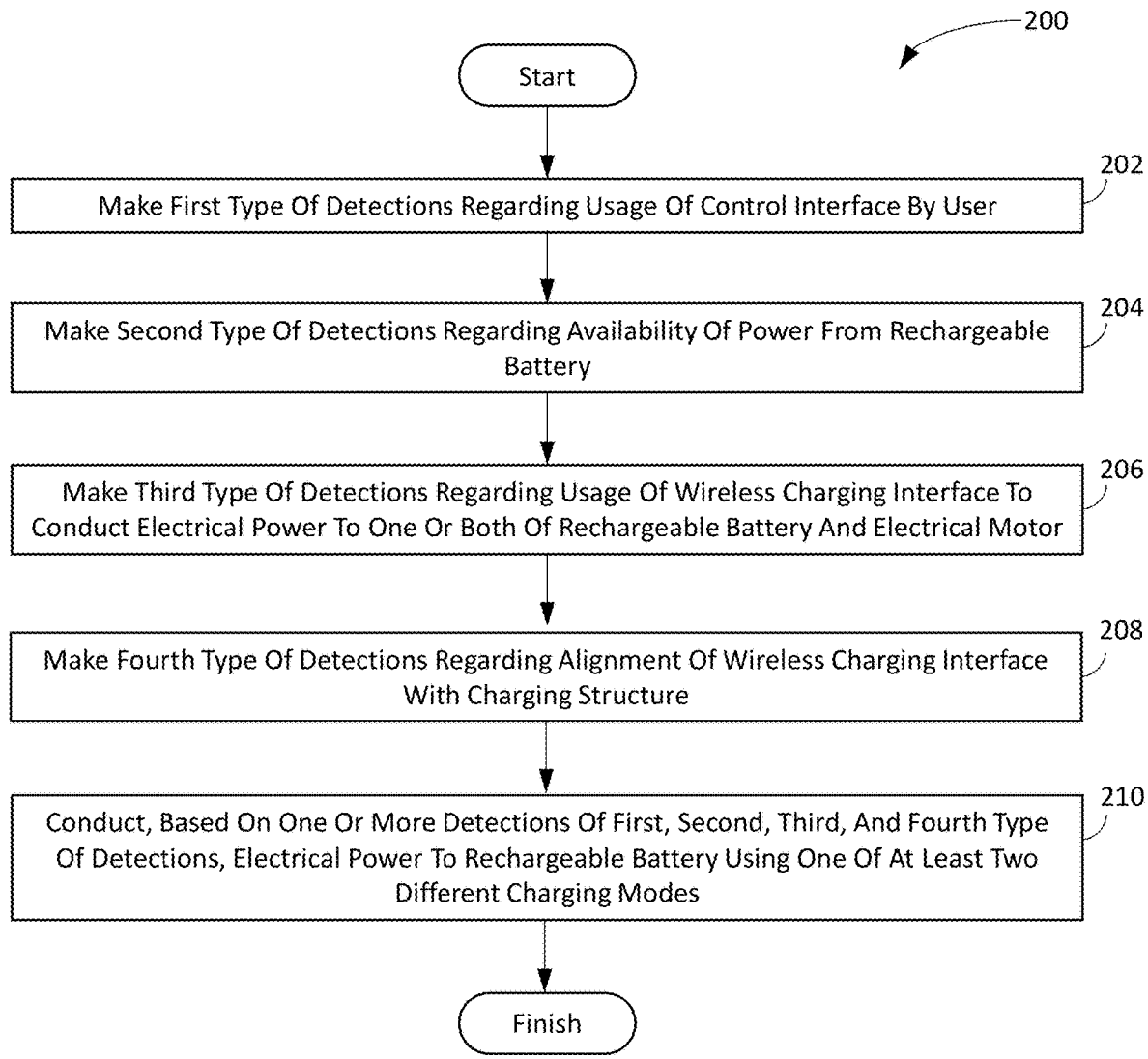
FIG. 2 shows a method for conducting electrical power to a rechargeable battery using different charging modes, in accordance with one or more implementations.

FIG. 2 illustrates a method 200 for controlling operation of a blender to use different charging modes and/or blending modes, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented using one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a first type of detections is made regarding usage of the control interface by a user. In some embodiments, operation 202 is performed by control circuitry the same as or similar to charging control circuitry 27 (shown in FIG. 1 and described herein).

At an operation 204, a second type of detections is made regarding availability of power from the rechargeable battery. In some embodiments, operation 204 is performed by control circuitry the same as or similar to charging control circuitry 27 (shown in FIG. 1 and described herein).

At an operation 206, a third type of detections is made regarding usage of the wireless charging interface to conduct electrical power to one or both of the rechargeable battery and the electrical motor. In some embodiments, operation 206 is performed by control circuitry the same as or similar to charging control circuitry 27 (shown in FIG. 1 and described herein).

At an operation 208, a fourth type of detections in made regarding alignment of the wireless charging interface with the charging structure. In some embodiments, operation 208 is performed by control circuitry the same as or similar to charging control circuitry 27 (shown in FIG. 1 and described herein).

At an operation 210, based on one or more detections of the first, second, third, and fourth type of detections, electrical power is conducted to the rechargeable battery using one of at least two different charging modes, including a first charging mode and a second charging mode (described in FIG. 1 herein). In some embodiments, operation 210 is performed by control circuitry the same as or similar to charging control circuitry 27 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A blender configured for wireless charging of a rechargeable battery using different charging modes, the blender comprising:
    a base assembly, a container assembly, a blending component, a control interface, blending control circuitry, and charging control circuitry,
    wherein the blending component is configured to rotate around a rotational axis and blend the foodstuffs during blending by the blender,
    wherein the base assembly includes:
        an electrical motor configured to drive rotation of the blending component;
        the rechargeable battery configured to power the electrical motor; and
        a wireless charging interface configured to conduct electrical power to one or both of the rechargeable battery and the electrical motor, wherein the wireless charging interface includes a secondary coil, wherein the wireless charging interface supports inductive charging through a charging structure that includes a primary coil;
    wherein the container assembly is configured to hold the foodstuffs within a container body during blending by the blender;
    wherein the control interface is configured to control operation of the blender upon usage of the control interface by a user;
    wherein the charging control circuitry is configured to:
        make a detection regarding alignment of the wireless charging interface with the charging structure; and
        conduct, based on the detection, the electrical power to the rechargeable battery using one of at least two different charging modes, including a first charging mode and a second charging mode, wherein:
            (i) during the first charging mode, a first amount of electrical power is conducted by the wireless charging interface to the rechargeable battery at a first charging rate, and
            (ii) during the second charging mode, a second amount of electrical power is conducted by the wireless charging interface to the rechargeable battery at a second charging rate, and wherein the first charging rate is greater than the second charging rate;
    wherein the blending control circuitry is configured to:
        control the electrical motor during the rotation of the blending component.

2. The blender of claim 1, wherein the blending control circuitry is further configured to control the electrical motor during the rotation of the blending component using at least two different power modes of operation, including a first power mode of operation and a second power mode of operation.

3. The blender of claim 1, wherein the charging structure is powered through an external power source that is external to the blender.

4. The blender of claim 1, wherein the control interface includes a button configured to be pushed by the user.

5. The blender of claim 4, wherein, responsive to:
(i) a first detection that the button has been pushed,
(ii) a second detection that at least some the power from the rechargeable battery is unavailable,
(iii) a third detection that the wireless charging interface is being used to conduct the electrical power,
the charging control circuitry is configured to conduct the electrical power to the rechargeable battery and the blending control circuitry is configured to provide the electrical power to the electrical motor.

6. The blender of claim 4, wherein responsive to:
(i) a first detection that the button has been pushed,
(ii) a second detection that no power from the rechargeable battery is available,
(iii) a third detection that the wireless charging interface is being used to conduct the electrical power,
the charging control circuitry is configured to conduct the electrical power to the rechargeable battery and the blending control circuitry is configured to provide the electrical power to the electrical motor.

7. The blender of claim 1, wherein the base assembly includes one or more other charging interfaces, wherein the one or more other charging interfaces include a universal serial bus (USB) port.

8. The blender of claim 1, wherein the detection regarding alignment includes detecting alignment of one or more non-electrical prongs of the charging structure with corresponding one or more non-electrical ports of the base assembly to accomplish at least one of (i) align the primary coil and the secondary coil, (ii) facilitate reduction of oscillation of the base assembly during the rotation of the blending component, and (iii) facilitate reduction of oscillation of the container body during the rotation of the blending component.

9. The blender of claim 1, wherein the detection regarding alignment includes detecting a threaded coupling between a threaded nut attached to the charging structure and a screw attached to the base assembly to accomplish at least one of (i) align the primary coil and the secondary coil, (ii) facilitate reduction of oscillation of the base assembly during the rotation of the blending component, and (iii) facilitate reduction of oscillation of the container body during the rotation of the blending component.

10. The blender of claim 1, wherein the detection regarding alignment includes detecting fastening of a first part a spring-loaded toggle latch attached to the base assembly with a second part of the spring-loaded toggle latch attached to the charging structure to accomplish at least one of (i) align the primary coil and the secondary coil, (ii) facilitate reduction of oscillation of the base assembly during the rotation of the blending component, and (iii) facilitate reduction of oscillation of the container body during the rotation of the blending component.

11. The blender of claim 1, wherein upon the detection that the wireless charging interface is aligned with the charging structure, the charging control circuitry is configured to conduct the electrical power to the rechargeable battery and/or the electrical motor at about 15V.

12. A method for wireless charging of a rechargeable battery within a blender for blending foodstuffs using different charging modes, wherein the blender includes a blending component, a control interface, an electrical motor, and a wireless charging interface that includes a secondary coil and supports inductive charging through a charging structure that includes a primary coil, the method comprising:
making a detection regarding alignment of the wireless charging interface with the charging structure;
conducting, based on the detection, the electrical power to the rechargeable battery using one of at least two different charging modes, including a first charging mode and a second charging mode, wherein:
(i) during the first charging mode, a first amount of electrical power is conducted by the wireless charging interface to the rechargeable battery at a first charging rate, and
(ii) during the second charging mode, a second amount of electrical power is conducted by the wireless charging interface to the rechargeable battery at a second charging rate, and wherein the first charging rate is greater than the second charging rate;
controlling the electrical motor during the rotation of the blending component.

13. The method of claim 12, further comprising:
controlling the electrical motor during the rotation of the blending component using at least two different power modes of operation, including a first power mode of operation and a second power mode of operation.

14. The method of claim 12, wherein the control interface includes a button that is pushed by the user.

15. The method of claim 12, wherein the detection regarding alignment includes detecting alignment of one or more non-electrical prongs of the charging structure with corresponding one or more non-electrical ports of attached to the blender to accomplish at least one of (i) align the primary coil and the secondary coil, (ii) facilitate reduction of oscillation of the blender during the rotation of the blending component, and (iii) facilitate reduction of oscillation of the container body during the rotation of the blending component.

16. The method of claim 12, wherein the detection regarding alignment includes detecting a threaded coupling between a threaded nut attached to the charging structure and a screw attached to the blender to accomplish at least one of (i) align the primary coil and the secondary coil, (ii) facilitate reduction of oscillation of the blender during the rotation of the blending component, and (iii) facilitate reduction of oscillation of the container body during the rotation of the blending component.

17. The method of claim 12, wherein the detection regarding alignment includes detecting fastening of a first part a spring-loaded toggle latch attached to the blender with a second part of the spring-loaded toggle latch attached to the charging structure to accomplish at least one of (i) align the primary coil and the secondary coil, (ii) facilitate reduction of oscillation of the blender during the rotation of the blending component, and (iii) facilitate reduction of oscillation of the container body during the rotation of the blending component.

18. The method of claim 12, wherein upon the detection that the wireless charging interface is aligned with the charging structure, the charging control circuitry is configured to conduct the electrical power to the rechargeable battery and/or the electrical motor at about 15V.

* * * * *